(12) United States Patent
Bierhuizen et al.

(10) Patent No.: US 8,212,263 B2
(45) Date of Patent: Jul. 3, 2012

(54) BACKLIGHT INCLUDING SEMICONDUCTIOR LIGHT EMITTING DEVICES

(75) Inventors: Serge J. Bierhuizen, Santa Rosa, CA (US); Gregory W. Eng, Santa Rosa, CA (US)

(73) Assignees: Koninklijke Philips Electronics N.V., Eindhoven (NL); Philips Lumileds Lighting Company, LLC, San Jose, CA (US)

( * ) Notice: Subject to any disclaimer, the term of this patent is extended or adjusted under 35 U.S.C. 154(b) by 533 days.

(21) Appl. No.: 12/417,673

(22) Filed: Apr. 3, 2009

(65) Prior Publication Data

US 2010/0252846 A1    Oct. 7, 2010

(51) Int. Cl.
*H01L 31/12* (2006.01)

(52) U.S. Cl. .................. 257/81; 257/79; 257/80

(58) Field of Classification Search ............... 257/79–81
See application file for complete search history.

(56) References Cited

U.S. PATENT DOCUMENTS

| | | | |
|---|---|---|---|
| 4,040,078 A * | 8/1977 | Eckton et al. ............ | 250/551 |
| 4,767,172 A | 8/1988 | Nichols et al. | |
| 5,635,115 A * | 6/1997 | Konishi et al. ............ | 264/1.7 |
| 7,344,902 B2 | 3/2008 | Basin et al. | |
| 2004/0070333 A1 * | 4/2004 | Lin et al. .................. | 313/500 |
| 2005/0001952 A1 | 1/2005 | Han | |
| 2005/0174806 A1 | 8/2005 | Sakai et al. | |
| 2006/0126343 A1 | 6/2006 | Hsieh et al. | |
| 2006/0262564 A1 | 11/2006 | Baba | |
| 2007/0086179 A1 | 4/2007 | Chen et al. | |
| 2007/0252227 A1 * | 11/2007 | Fukuda et al. ............ | 257/432 |
| 2008/0174999 A1 | 7/2008 | Chiang | |
| 2009/0045420 A1 | 2/2009 | Eng et al. | |
| 2009/0046479 A1 | 2/2009 | Bierhuizen | |
| 2009/0051846 A1 | 2/2009 | Horiuchi et al. | |
| 2009/0242905 A1 * | 10/2009 | Ogihara et al. ............ | 257/88 |
| 2009/0294780 A1 * | 12/2009 | Chou et al. ............... | 257/88 |

FOREIGN PATENT DOCUMENTS

WO    2008152561 A1    12/2008

* cited by examiner

*Primary Examiner* — James Mitchell

(57) ABSTRACT

A light source such as a semiconductor light emitting diode is positioned in a first opening in a transparent member, which may function as a waveguide in a display. The transparent member surrounds the light source. No light source is positioned in a second opening in the transparent member. In some embodiments, the first opening is shaped to direct light into the transparent member. In some embodiments, a reflector is positioned over the light source. The reflector includes a flat portion and a shaped portion. The shaped portion extends from the flat portion toward the light source.

10 Claims, 3 Drawing Sheets

BACKLIGHT INCLUDING SEMICONDUCTIOR LIGHT EMITTING DEVICES

FIELD OF INVENTION

The present invention is directed to a lighting device including a light source disposed in an opening in a transparent member. Such a lighting device may be used, for example, as a backlight for a display.

BACKGROUND

Semiconductor light emitting devices such as light emitting diodes (LEDs) are among the most efficient light sources currently available. Material systems currently of interest in the manufacture of high brightness LEDs capable of operation across the visible spectrum include group III-V semiconductors, particularly binary, ternary, and quaternary alloys of gallium, aluminum, indium, and nitrogen, also referred to as III-nitride materials; and binary, ternary, and quaternary alloys of gallium, aluminum, indium, arsenic, and phosphorus. Often III-nitride devices are epitaxially grown on sapphire, silicon carbide, or III-nitride substrates and III-phosphide devices are epitaxially grown on gallium arsenide by metal organic chemical vapor deposition (MOCVD), molecular beam epitaxy (MBE), or other epitaxial techniques. Often, an n-type region is deposited on the substrate, then a light emitting or active region is deposited on the n-type region, then a p-type region is deposited on the active region. The order of the layers may be reversed such that the p-type region is adjacent to the substrate.

One promising use of semiconductor light emitting devices is for backlights in liquid crystal displays (LCDs). LCDs are commonly used in cellular phones, personal digital assistants (PDAs), portable music players, laptop computers, desktop monitors, and television applications. One embodiment of the present invention deals with a color or monochrome, transmissive LCD that requires backlighting, where the backlight may use one or more LEDs emitting white or colored light. Embodiments using blue LEDs and a remote phosphor layer for white light generation are also possible. The LEDs are distinguished from laser diodes in that the LEDs emit incoherent light.

One backlight is described in US Published Application 2009-0045420, which is incorporated herein by reference, and illustrated in FIG. 1. "A side-emitting LED 10, mounted on a mount 22, is positioned in an opening in a section of solid, transparent waveguide material 36 . . . . Waveguide section 36 [is] positioned in slot 42 of a larger waveguide 40."

SUMMARY

Embodiments of the invention are directed to lighting devices that can be used as backlights for displays. An object of the invention is to provide a transparent member with openings for actual and virtual light sources. A light source such as a semiconductor light emitting diode is positioned in a first opening of the transparent member, which may function as a waveguide in a display. The transparent member surrounds the light source. In embodiments of the lighting device, top-emitting LEDs, rather than side-emitting LEDs, may be used. No light source is positioned in a second opening in the transparent member. The second opening may act as a virtual light source.

In some embodiments, a reflector is positioned over the light source. The reflector includes a flat portion and a shaped portion. The shaped portion extends from the flat portion toward the light source. Embodiments of the invention may reduce the number of light sources necessary for the lighting device to produce a desired amount of light with sufficient uniformity and mixing of the light.

DETAILED DESCRIPTION

Backlights where the LEDs are positioned inside the waveguide, such as the backlight described in US 2009-0045420, are beneficial because the waveguide, and therefore the backlight, can be kept thin. It is also desirable to reduce the number of LEDs used in the backlight, to reduce the cost of the backlight. LEDs that emit a majority of light from the top surface of the LED may have slightly higher flux than the side-emitting LEDs described in US 2009-0045420. Embodiments of the invention are directed to devices such as backlights with top-emitting LEDs positioned inside a waveguide.

Figure 1:
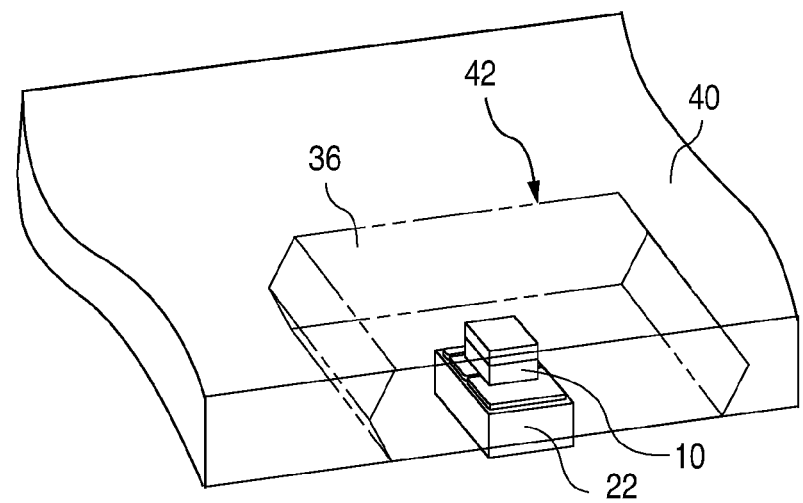
FIG. 1 is a perspective view of a waveguide section positioned in a waveguide.
Figure 2:
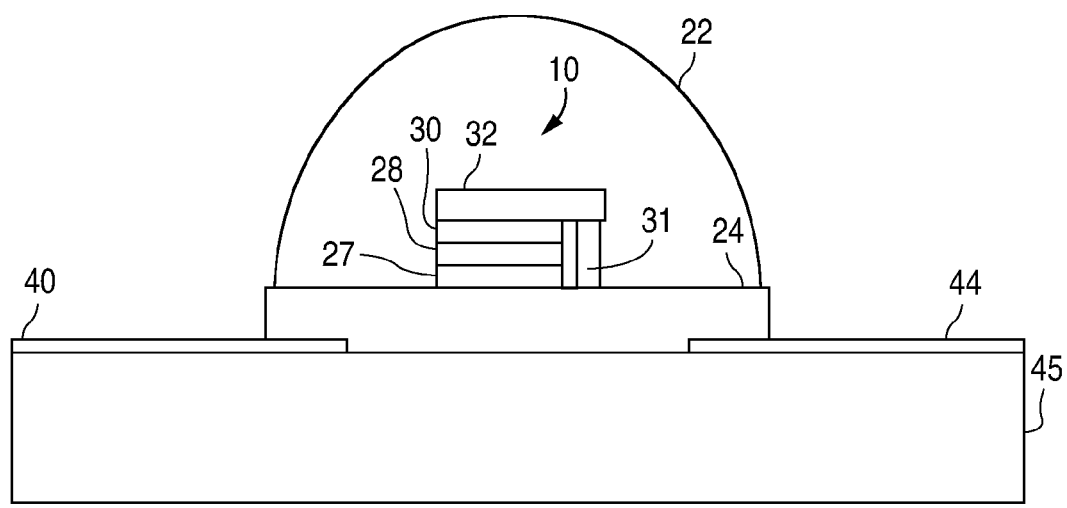
FIG. 2 is a cross sectional view of a thin film flip chip LED with an overmolded dome lens.

One example of suitable top-emitting light is an LED with an overmolded dome lens. Examples of suitable LEDs with dome lenses are described in, for example, U.S. Pat. No. 7,344,902, which is incorporated herein by reference. FIG. 2 is a simplified close-up view of an LED with a dome lens, described in U.S. Pat. No. 7,344,902, which is incorporated herein by reference. A single flip-chip LED die 10 is mounted on a mount 24 formed of any suitable material, such as a ceramic or silicon. The LED die 10 of FIG. 2 has a p-metal contact 27, p-type layers 28, a light emitting active layer 30, n-type layers 32, and an n-metal contact 31 contacting the n-type layers 32. Metal pads on mount 24 are directly metal-bonded to contacts 27 and 31. Vias through mount 24 terminate in metal pads on the bottom surface of mount 24, which are bonded to the metal leads 40 and 44 on a circuit board 45. The metal leads 40 and 44 are connected to other LEDs or to a power supply. Circuit board 45 may be a metal plate (e.g., aluminum) with the metal leads 40 and 44 overlying an insulating layer. The molded lens 22 encapsulates the LED die 10.

The n-type layers 32, light emitting layer 30, and p-type layers 28 are grown on a growth substrate, then a portion of light emitting layer 30 and p-type layers 28 are etched away to reveal a portion of n-type layers 32. N- and p-contacts 31 and 27 are formed on the exposed portions of the n- and p-type semiconductor layers. To reduce the thickness of LED 10 and to prevent light from being absorbed by the growth substrate, the growth substrate is removed by a method suitable to the substrate, such as etching, chemical-mechanical polishing, or laser melting, where a laser heats the interface of the III-nitride structure and growth substrate, melting a portion of the III-nitride structure and releasing the substrate from the semiconductor structure. The growth substrate may be removed after an array of LEDs are mounted on a submount wafer and prior to the LEDs/submounts being singulated (e.g., by sawing).

After the growth substrate is removed, in some embodiments the remaining III-nitride structure is thinned and/or roughened or patterned, for example with a photonic crystal.

A substantially planar phosphor layer, not shown in FIG. 2, may be positioned over the top of the LED for wavelength-converting at least some of the blue light emitted from the light emitting layer 30. The phosphor layer may be preformed as a ceramic sheet and affixed to the LED layers, or the phosphor particles may be deposited, such as by electrophoresis. The light emitted by the phosphor layer, when mixed with blue light from the LED's active region, creates white light or another desired color. For example, a blue-emitting LED may be combined with a single yellow-emitting phosphor, or with a red-emitting phosphor and a green-emitting phosphor, to create white light. If a UV-emitting LED is used, a blue-emitting phosphor may be added. Phosphors emitting other colors of light may be added to the LED or somewhere else remotely in the system to achieve a desired color point of the mixed, white light.

Figure 7:
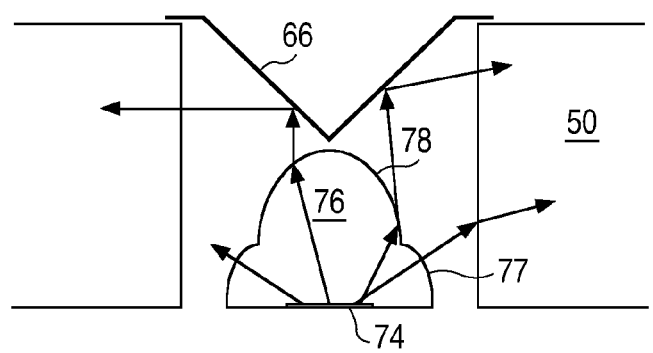
FIG. 7 illustrates an LED with a shaped lens.

The dome lens 20 shown in FIG. 2 is then molded over LED 10. Embodiments of the invention may use thin film flip chip LEDs, as illustrated in FIG. 2, with or without dome lens 10. Lens shapes other than the spherical dome lens shown in FIG. 2 may be used to modify the radiation pattern of the device. The lens may be shaped to control ray angles and propagation in the waveguide such as slightly more collimated in the plane of the waveguide. FIG. 7 illustrates a device with a shaped lens 76. Lens 76 includes a top section 78 shaped to direct light into reflector 66 (described below in reference to FIG. 4), and a bottom section shaped to direct light into waveguide 50.

Figure 3:
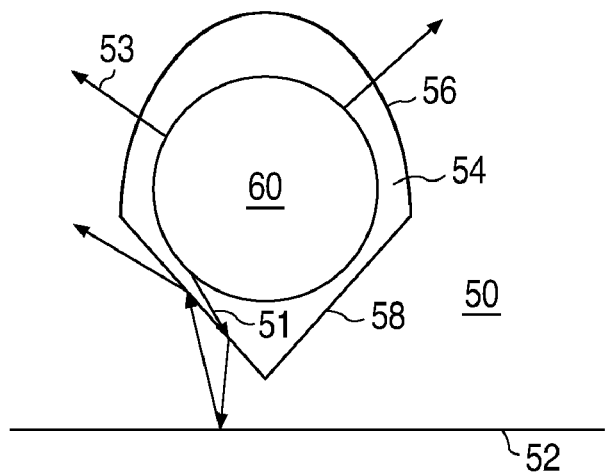
FIG. 3 is a top view of an LED disposed in an opening in a portion of a waveguide.

FIG. 3 is a top view of a top-emitting LED positioned in a waveguide according to embodiments of the invention. Though an LED with a dome lens is illustrated, a device without a dome lens may be used. A domed LED 60, mounted on a mount (not shown in FIG. 3), is positioned in an opening 54 formed near the edge 52 of a solid, transparent waveguide 50. Openings 54 may be large enough that the edge of the dome of LED 60 is between 100 micron and 2.5 mm from the edge of the opening, for easy placement of LED 60 in opening 54. Waveguide 50 may be, for example, acrylic (e.g., PMMA), hard silicone, molded plastic, polycarbonate, or any other suitable material. A mirror film (not shown) may cover the bottom of waveguide 50. The film may be, for example, enhanced specular reflector (ESR) film available from 3M corporation.

Opening 54 is shaped to direct light into waveguide 50. In the device shown in FIG. 3, a portion 58 of opening 54 near the edge 52 of waveguide 50 is V-shaped, while a portion 56 of opening 54 furthest from the edge is curved. Light 53 that is incident on the curved edge 56 is emitted into waveguide 50, as illustrated. Light 51 that is incident on the V-shaped edge 58 is refracted toward waveguide edge 52, where it may be reflected into waveguide 50. Simple round or slightly elliptically-shaped openings 54 may also be used. In addition, the edges of the in-coupling edges 56 and 58 may be corrugated to spread the distribution of the light in the waveguide to achieve the desired uniformity while reducing the LED count.

Figure 4:
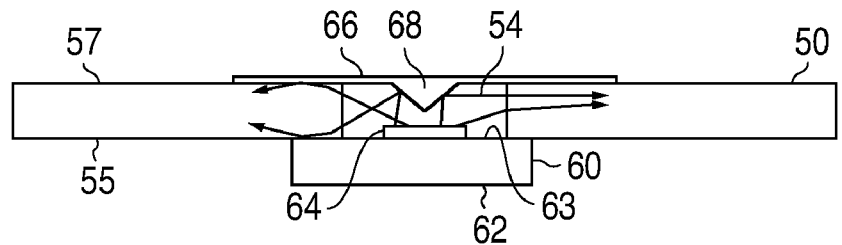
FIG. 4 is a cross sectional view of an LED disposed in an opening in a waveguide.

FIG. 4 is a cross section of a top-emitting LED positioned in a waveguide according to embodiments of the invention. Though an LED without a dome lens is illustrated, a device with a dome lens may be used. LED 60 includes a semiconductor LED structure 64 mounted on a support 62. LED 60 may be positioned in the opening 54 in waveguide 50 such that support 62 is below the bottom 55 of waveguide 50 and semiconductor structure 64 is above the bottom 55 of waveguide 50. A top surface 63 of support 62 may be reflective.

Since LED 60 is a top-emitting LED, a reflector 66 is positioned over LED 60, to redirect the emitted light into waveguide 50. Reflector 66 may include a section 68 that protrudes below the top surface 57 of waveguide 50, to direct light into waveguide 50, as illustrated in FIG. 4. Protruding section 68 may be shaped to avoid reflecting light emitted normal to the top surface of semiconductor structure 64 directly back into semiconductor structure 64, where it may be absorbed. One suitable shape for protruding section 68 is a cone, as illustrated in FIG. 4. The cone illustrated in FIG. 4 may have dimensions between the diameter of the LED dome and the dimensions of opening 54. Other shapes may be possible such as a curved or parabolic shape. The reflector angle can vary from, for example, 15° to 60°. Reflector 66 may be formed from any rigid material, such as plastic, and may be coated with a reflective material, such as a reflective metal, coating, paint, or dichroic stack. Alternatively, reflector 66 may be formed from a material that causes total internal reflection. Reflector 66 may have, for example, the same lateral extent as opening 54, or slightly larger, so the edges of reflector 66 may rest on the top of waveguide 50.

In a large backlight, such as for a computer monitor or television, multiple LEDs are positioned along the edge 52 of waveguide 50. The spacing of the LEDs and openings is a function of the number of LEDs used and the linear dimension of the backlight. For example, in a conventional 24 inch backlight, 60 LEDs may be used to achieve good color uniformity. Using the described embodiments the number of LEDs may be reduced to 15 to 30 LEDs for the same 24 inch backlight without sacrificing uniformity or increasing the bezel length.

Figure 5:
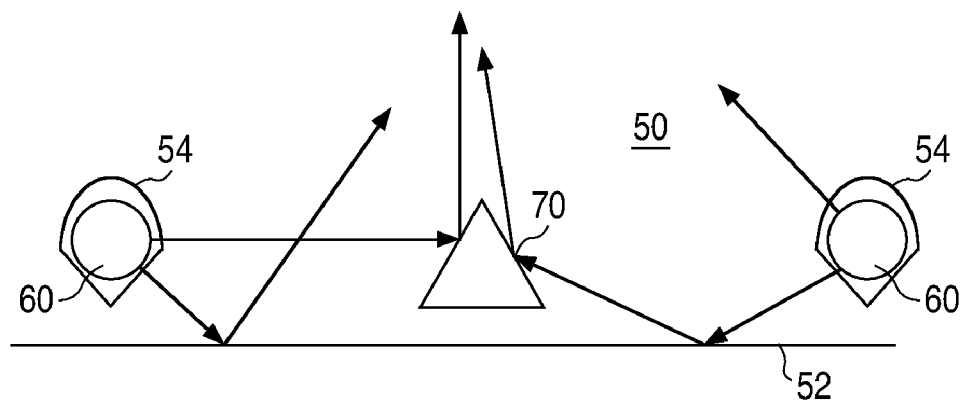
FIG. 5 is a top view of a portion of a waveguide with actual and virtual light sources.

FIG. 5 is a top view of a portion of a waveguide. Two LEDs 60 are positioned in openings 54, as illustrated above in FIG. 3. An opening 70 spaced between openings 54 does not contain an LED. Light emitted from LEDs 60 reflects off the edges of opening 70, making opening 70 a "virtual" light source. In some embodiments, one or more edges of opening 70 are coated with a reflective material. The virtual sources may be placed between the LED openings and can extend in width from the LED width up to ¾ the space in between the LEDs. In some embodiments, opening 70 is filled with a material with a low index or refraction, such as air or low index of refraction silicone. Including openings 70 without LEDs positioned in the openings may improve the uniformity of the backlight, as compared with a backlight with the same number of LEDs without empty openings 70, or for a given level of mixing and uniformity of the light in waveguide 50, may permit LEDs 60 to be spaced further apart, as compared with a backlight without empty openings 70. Improved mixing and uniformity may reduce the required backlight and monitor bezel height and can therefore be minimized or kept constant when reducing the number of LEDs.

Figure 6:
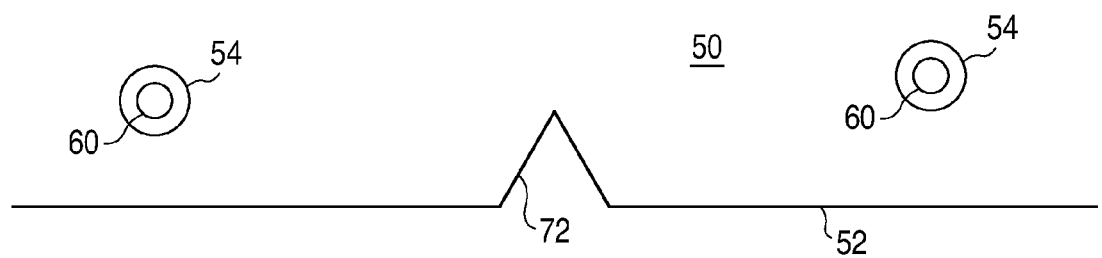
FIG. 6 is a top view of a portion of a waveguide including a feature to reflect light.

FIG. 6 is a top view of a waveguide with features formed on the edge of the waveguide between openings for LEDs. Instead of, or in addition to, the empty openings 70 illustrated in FIG. 5, in the device of FIG. 6, features 72 are formed on the edge 52 of waveguide 50. Features are shaped to reflect light emitted by LEDs 60 toward adjacent LEDs into the body of waveguide 50. One example of a suitable shape for feature 72 is a V-shaped notch in the edge 52 of waveguide 50, as illustrated in FIG. 6. In some embodiments, feature 72 is curved. The edge 52 of waveguide 50, including feature 72, may be reflective, for example by coating the edge with a reflective film or attaching a film to the edge. As illustrated in FIG. 6, openings 54 in which LEDs 60 are positioned need not be shaped as illustrated in FIG. 3. In the device illustrated in FIG. 6, openings 54 are round. Other shapes are within the scope of the invention. The V-shaped features may start close to the LED and have a continuous curved shape.

Figure 8:
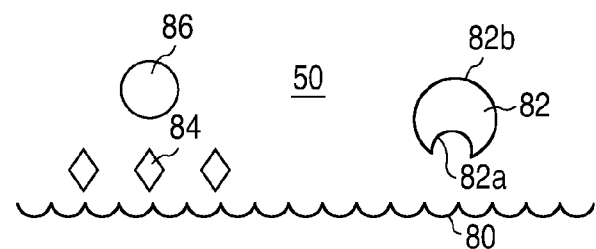
FIG. 8 is a top view of a portion of a waveguide.

In some embodiments, the features illustrated in various figures may be combined. For example, as described above, top-emitting LEDs with or without dome lenses may be used. The top reflector illustrated in FIG. 4 may be used over the openings in the devices illustrated in FIGS. 3, 5, and 6. Openings with different shapes may be used in the various embodiments. FIG. 8 illustrates some variations. In addition to or instead of features 72 shown in FIG. 6, the edge of waveguide 50 may include multiple features positioned adjacent to each other, such that the edge is continuously textured, as in the scalloped shape 80 illustrated in FIG. 8. Alternatively, multiple features on the edge may be positioned adjacent each other, then separated from the next group of multiple features on the edge by a section of untextured edge. Virtual sources 84 may be spaced closer to the edge of waveguide 50 than openings 86 in which actual light sources are positioned. Multiple virtual sources 84 may be positioned near a single actual source 86. Other shapes may be used for openings for both virtual and actual light sources. Opening 82 illustrated in FIG. 8 has a curved portion 82a that curves in toward the center of the opening, as opposed to curved portion 82b which curves out away from the center of the opening.

The embodiments described above may be used as a backlight for an LCD display. In a finished display, a thin diffuser film may be affixed over the top surface of the waveguide 50 to diffuse the light. A brightness enhancement film (BEF) may be disposed over the diffuser film to redirect light to within a relatively small angle directly in front of the waveguide 50 to increase the brightness in the normal viewing direction. A conventional color or monochrome LCD is then disposed over waveguide 50. The LCD can produce color images using pixel shutters (e.g., a liquid crystal layer in combination with a TFT array), polarizers, and RGB filters. Such LCDs are well known. Other applications of the embodiments described above include thin poster boxes.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is being claimed is:

1. A device comprising:
   a light source comprising a semiconductor structure comprising a light emitting layer disposed between an n-type region and a p-type region;
   a transparent member, comprising a first opening and a second opening, wherein:
   the light source is positioned in the first opening such that the transparent member surrounds the light source;
   the first opening is positioned near an edge of the transparent member;
   a first portion of the first opening is proximate the edge and is shaped to direct light toward the edge;
   a second portion of the first opening is opposite the edge and is shaped to direct light away from the edge; and
   no light source is positioned in the second opening.

2. The device of claim 1 wherein each of the first and second openings comprises a hole in the transparent member.

3. The device of claim 1 wherein the light source is configured such that a majority of light escapes the light source through a top surface of the semiconductor structure.

4. The device of claim 1 wherein the light source comprises a dome lens disposed over the semiconductor structure.

5. The device of claim 1 wherein the first portion is curved and the second portion is V-shaped.

6. A device comprising:
   a light source comprising a semiconductor structure comprising a light emitting layer disposed between an n-type region and a p-type region;
   a reflector positioned over the light source, the reflector comprising a flat portion and a shaped portion, wherein the shaped portion extends from the flat portion toward the light source;
   a transparent member, comprising a first opening and a second opening, wherein:
   the light source is positioned in the first opening such that the transparent member surrounds the light source;
   the first opening is positioned near an edge of the transparent member; and
   no light source is positioned in the second opening.

7. The device of claim 6 wherein the shaped portion of the reflector comprises a cone.

8. A device comprising:
   a light source comprising a semiconductor structure comprising a light emitting layer disposed between an n-type region and a p-type region;
   a transparent member, comprising a first opening and a second opening, wherein:
   the light source is positioned in the first opening such that the transparent member surrounds the tight source;
   the first opening is positioned near an edge of the transparent member;
   no light source is positioned in the second opening; and
   the first opening has a curved portion and the second opening with a shape different than that of the first opening has a least one straight side.

9. The device of claim 8 further comprising a reflective coating disposed on sidewalls of the second opening.

10. The device of claim 1 further comprising a liquid crystal layer disposed over the transparent member.

* * * * *